May 21, 1968 — D. BAKER ETAL — 3,383,757
THERMO-COMPRESSION BONDING OF METALS TO
SEMICONDUCTOR, METALLIC, OR
NON-METALLIC SURFACES
Filed Feb. 25, 1965
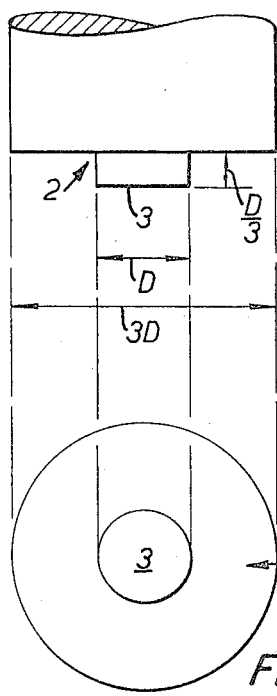
FIG. 1.
FIG. 2.
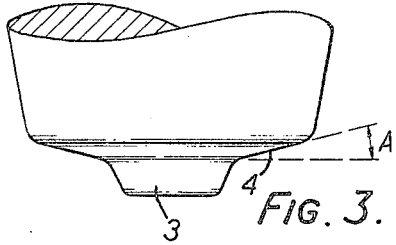
FIG. 3.
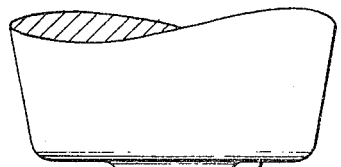
FIG. 4.
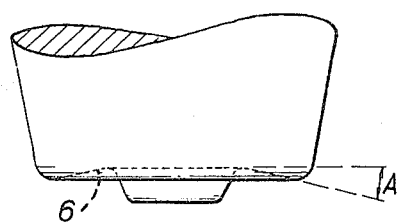
FIG. 5.
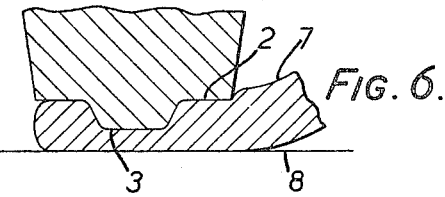
FIG. 6.
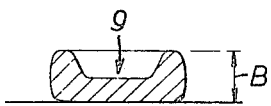
FIG. 8.
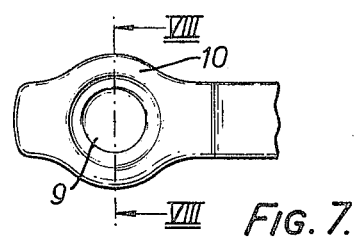
FIG. 7.
DENNIS BAKER,
IAN E. BRYAN,
INVENTORS
BY Hall & Houghton
ATTORNEY

United States Patent Office 3,383,757
Patented May 21, 1968

3,383,757
THERMO-COMPRESSION BONDING OF METALS TO SEMICONDUCTOR, METALLIC, OR NON-METALLIC SURFACES
Dennis Baker, London, and Ian Ewart Bryan, North Wembley, England, assignors to Her Majesty's Postmaster General, London, England
Filed Feb. 25, 1965, Ser. No. 435,272
Claims priority, application Great Britain, Mar. 2, 1964, 8,781/64
7 Claims. (Cl. 29—472.9)

ABSTRACT OF THE DISCLOSURE

A method of effecting a thermo-compression bond between a wire and a surface in which a tool having a central protuberance is pressed on to the areas to be bonded. The central protuberance produces a deformation and causes the wire to flow plastically outwards in a radial manner from the bond zone to be constrained by the tool face surrounding the protuberance to form an annular wall round the bond zone.

---

This invention relates to the bonding of metals, for example metallic leads, to semiconductor, metallic and non-metallic surfaces and has particular reference to bonding by the process known as "thermo-compression" bonding. That process involves heating the surfaces to be bonded, applying a pressure sufficient to produce a required degree of deformation and maintaining both temperature and pressure for a stated period. The temperature is always above room temperature but well below the lowest eutectic temperature of any specific combination of materials being bonded. Where semiconductor materials are involved, the temperature selected is also well below that at which dislocations in those materials may form or be displaced. The use of higher-than-room temperatures reduces the pressure required to effect bonding as compared with "cold-welding."

Processes of thermo-compression bonding have already been proposed in which a bonding tool is used having either a pointed end or a chisel-shaped end. In addition, it has been proposed to use a tool with an annular pressure-applying surface to bond a ball-ended conductor in position. The pointed and chisel-shaped tools cause some weakening of the physical strength of the conductor whilst the annular surface can be used only with the ball-ended configuration and not all materials which it may be desired to bond can be given that configuration.

According to the present invention a method of effecting a thermo-compression bond between the surface of a metallic conductor and another surface (hereinafter sometimes called substrate material) includes the steps of bringing the surfaces to a temperature of at least 100° C. but less than the lowest eutectic temperature of any combination of the materials whose surfaces are to be bonded or, where the other surface is that of a material which is a semiconductor material, less than the temperature at which dislocations in the material are formed or displaced, if the latter temperature is below the lowest eutectic temperature, applying a maximum bonding pressure over the area of the two surfaces to be bonded sufficient to produce, in that area only, a deformation (as herein defined) in the metallic conductor of at least 20% but not more than 80%, constraining the metal to flow plastically from the center of that area in an outward, radial direction substantially parallel to the surfaces to be bonded and permitting the production round the area of the bond of a formation whose depth in a plane normal to the other surface is not substantially less than the thickness of the conductor in a plane normal to the length dimension of the conductor, the maximum bonding pressure and temperature being maintained for a period of time sufficient to allow formation of the bond.

The percentage deformation is defined as the percentage change in dimension of that portion of the metallic conductor upon which the maximum bonding pressure is applied which takes place in a direction parallel to that in which the maximum pressure is applied.

The period of time during which the maximum bonding pressure and temperature are maintained may be of the order of seconds for semiconductor materials, for example, 1–5 seconds but longer periods of one or several hours may be required for ceramics.

The plastic flow of metal from the area to be bonded is constrained by applying a pressure lower than the maximum bonding pressure to metal flowing plastically from that area.

Bonding may be effected by means of a tool having a working face with a central protuberance whose face area corresponds with the area over which maximum bonding pressure is to be applied and which is surrounded by a shoulder dimensioned to effect the required constraint on the plastic flow.

Where the metallic conductor is a wire of diameter D, the protuberance may be of cylindrical form having a diameter substantially equal to D and a height, measured from the shoulder, of substantially D/3. The shoulder is of annular form when the protuberance is cylindrical and has an outside diameter of from 2D to 4D. Such a tool is suitable for use in circumstances where the required deformation is from 20% to about 60%. If higher deformation is required, the height dimension D/3 of the protuberance must be increased beyond D/3 in order to avoid reducing the depth of the formation produced round the area of the bond. Such reduction would otherwise become excessive where high deformation is required and would weaken the resultant bond.

The face area of the protuberance may be elliptical in form, or rectangular, the shoulder being then of a similar form.

Where the metallic conductor is in the form of tape (or strip) the dimensions of the tool will be suitably related in the dimensions of the tape. For a narrow tape, the diameter of the protuberance, or the minor axis of the ellipse if the tape is so narrow as to require an elliptical form, will be substantially identical with the width of the tape. For a wider tape, the diameter of the protuberance will be such as to give a bond of adequate conductivity. The height of the protuberance will be such as to give the appropriate percentage deformation for bonding (which is broadly independent of the thickness of the tape) and an adequate depth of the formation produced round the area of the bond: this depth will need to be proportionately nearer the thickness of the tape for a thin tape than for a thick tape, to maintain the strength of the resultant bond.

By way of example only, a method of bonding surfaces embodying the invention and tools for use in that method will now be described in greater detail with reference to the accompanying drawings of which:

FIGS. 1 and 2 are side elevation and plan respectively of a theoretical form of tool tip, FIGS. 3, 4 and 5 are side elevations of practical tool tip forms, FIG. 6 is a vertical section on a reduced scale of surfaces during the bonding process, FIG. 7 is a plan view of a completed bond, and, FIG. 8 is a section on the line VIII—VIII of FIG. 7.

The method to be described is suitable for bonding a conductor wire of diameter D to the surface of another material.

FIGS. 1 and 2 show the theoretical form of the tool to be used for effecting the bond, those figures showing a tip 1 of cylindrical form, the tip having an end face 2 with a central protuberance 3. The diameter of the protuberance 3 is equal to D whilst that of the end face is 3D. The height of the protuberance as measured from the end face 2 is $D/3$. It is not essential that the diameter of the protuberance be exactly equal to that of the wire nor that the height of the protuberance should be exactly one third of the wire diameter but there should be substantial identity. Such a tool is suitable for use in circumstances where the required deformation is from 20% to about 60%. If higher deformation is required, the height of the protuberance must be increased in order to avoid reducing the depth of the formation produced round the area of the bond. Such reduction would otherwise become excessive where high deformation is required and would weaken the resultant bond.

The configuration shown in FIGS. 1 and 2 is theoretical only since in practice it is necessary to round the corners and taper the tip to facilitate its removal after bonding has been effected. A more practical form is shown in FIG. 3 from which it can be seen that there is tapering of both the protuberance 3 and the body of the tip 1. The end face 2 may itself be slightly "coned" is indicated at 4 in FIG. 3 or it may be flat and lie in a plane normal to the axis of the tool. The embodiment shown in FIG. 4 employs an end face which is flat as indicated at 5. Alternatively, the slightly concave configuration 6 shown in FIG. 5 might be adopted. The end face of the protuberance 3 might be flat as shown or convex, coned, concave or concave-spherical.

Variation of the angle A in FIGS. 3 and 5 varies the manner of plastic flow and thus a variety of bonding characteristics may be obtained. For example, a change from the configuration of FIG. 4 to that of FIG. 3, for the same applied load, causes greater reduction of thickness in the bond area and since the metal outside the bond area is not constrained to flow parallel to the bonding surfaces the bond strength is lower and less reproducible, whilst use of the concave configuration of FIG. 5 results in a smaller reduction of thickness in the bond area since outward flow of metal is restricted and the wire is spread over a larger area around the bonded region. Again, the bond strength is lower and less reproducible.

Other forms of tip may be employed, for example the tip may have a raised central pip and an annular lip. The generally annular form of the constructions described above is not essential, the central protuberance 3 could be elliptical when seen in plan or rectangular, a corresponding shape then being adopted for the end face 2. However, any configuration involving corners is less desirable as such corners tend to produce points of weakness in the bond. In all cases, the configuration of the tip provides a central area over which maximum bonding pressure is exerted and a surrounding area over which a smaller pressure is exerted and which constrains the plastic flow of metal from the bonding area.

Thermo-compression bonding involves the positioning of the conductor wire accurately on that part of the surface to which the wire is to be bonded, the heating of the surface and the wire, if necessary in a protective atmosphere, for example nitrogen, and then applying the bonding tool under a suitable pressure. FIG. 6 shows the position of the components prior to the removal of the tool at the completion of bonding.

The conductor wire 7 has previously been accurately positioned on a surface 8 and the tool applied under suitable pressure to an area of the wire adjacent the end of the latter as shown. The tool is of the configuration shown in FIG. 4 and has the dimensions given in FIGS. 1 and 2. The pressure applied to the tool is sufficient to cause a deformation of that part of the wire beneath the protuberance 3 of at least 20%. That deformation causes the wire to flow plastically outwardly in a radial manner from the area beneath the protuberance 3 and the outward flow is constrained by the end face 2 of the tool to follow directions parallel to the surface 8. Pressure is maintained for a short period which depends, amongst other things, upon the nature of the materials and is referred to in more detail later. The pressure applied to the tool is such as to cause limited deformation of the wire over the area in contact with the end face 2.

The configuration imposed on the wire during bonding is seen more clearly in FIGS. 7 and 8. The area 9 corresponding with the face of protuberance 3 is that over which maximum bonding pressure has been exerted and is surrounded by an annular wall 10 whose top-to-bottom dimension B is not substantially less than the diameter D.

The process just described is suitable for bonding a wide variety of materials, for example wire of aluminium, aluminium alloys, gold and gold alloys, copper, platinum and silver, can be bonded satisfactorily to metal films, bulk metals, semi-conductor materials and brittle materials such as glass and ceramics.

The process is particularly suitable for bonding conductor leads to the surfaces of semiconductor devices and to the connection posts of the devices. The extent of "spread" of the conductor wire during bonding is controlled and this is particularly important where extremely small dimensions are concerned as in semiconductor devices.

The process enables conductor wires of various materials to be connected, with increased reproducibility, to the contact areas of high reliability semiconductor devices or solid state circuits by bonding directly to the semiconductor or to metal films normally formed by evaporation on to the appropriate regions of the devices and circuits. The conductor wires can also be bonded using the process described above, directly to the "Kovar" surface of the terminal posts of the encapsulation structures for semiconductor devices, without the necessity of an intermediate gold plated layer. Thus where aluminium wires are used, the formation of undesirable gold-aluminium phases such as $AuAl_2$ is avoided.

The precise time during which bonding pressure is maintained depends upon the materials being bonded, the state of cleanliness of the surfaces, the temperature, and the nature of the protective atmosphere. The following table, Table I, gives details of temperature and time for different combinations of materials for a deformation of up to 60% in a protective atmosphere of nitrogen:

TABLE I

| Wire material | Substrate Material | Temperature, °C. | Time, (sec.) |
| --- | --- | --- | --- |
| Aluminium | Aluminium | 300 | 1 |
| Do | Silicon | 320 | 3 |
| Do | Germanium | 320 | 3 |
| Do | Kovar | 340 | 5 |
| Gold | Aluminium | 300 | 1 |
| Do | Silicon | 320 | 5 |
| Do | Germanium | 300 | 5 |
| Platinum | Aluminium | 340 | 1 |

Stripping tests of bonds made by the process given above and by existing technique show that bonds that are more reproducible and are generally stronger can be produced by the method embodying the invention than by existing techniques. The stripping tests are performed using a commercial microtensile machine by pulling the bonded wire at an inclination of approximately 30° to the substrate surface while observing the bond through a microscope at right angles to the wire. The load is applied by means of a calibrated torsion wire until the bond fails. In each case, the bond is made between a wire and a metal substrate under the conditions given in Table I, and the results are set out in the following table, Table II:

TABLE II

| Structure materials | | Breaking load in grams of bond made with chisel tool | Breaking load in grams of bond made with annular tool | Breaking load in grams of bond made according to present invention | |
|---|---|---|---|---|---|
| Wire | Aluminium | 0.8 | (¹) | 2.5 | Mean. |
| Substrate | Aluminium | 0-1.5 | (¹) | 2.25-2.85 | Range. |
| Wire | Aluminium | 0.5 | (¹) | 2.2 | Mean. |
| Substrate | Silicon | 0-1.0 | (¹) | 1.9-2.7 | Range. |
| Wire | Aluminium | (¹) | (¹) | 2.5 | Mean. |
| Substrate | Kovar | (¹) | (¹) | 2.2-2.7 | Range. |
| Wire | Gold | 2.0 | 6.0 | 5.5 | Mean. |
| Substrate | Aluminium | 0.5-4.0 | 1.0-8.0 | 5.0-6.0 | Range. |
| Wire | Gold | 1.0 | (²) | 3.0 | Mean. |
| Substrate | Silicon | 0-2.0 | (²) | 2.5-4.0 | Range. |

¹ Not possible to bond.
² Not possible to bond with present conditions.

We claim:
1. A method of effecting a thermocompression bond between the surface of a metallic conductor and a substrate surface selected from the group consisting of metals, ceramics and semi-conductors, said method including the steps of bringing both surfaces to a temperature of at least 100° C. but less than the lowest eutectic temperature of any alloy of the materials whose surfaces are being bonded, and, where the substrate surface is that of a semiconductor material, less than the temperature at which dislocations in the material are formed or displaced, applying a bonding pressure to an area of the two surfaces to be bonded sufficient to produce, in that area only, a deformation in the metallic conductor of at least 20% but not more than 80%, constraining the metal of the conductor to flow plastically from the center of that area in an outward, radial direction substantially parallel to the surfaces to be bonded, permitting the production round that area of a formation whose depth measured in a plane normal to the other surface is not substantially less than the thickness of the conductor, and maintaining said bonding pressure and the temperature for a period sufficient to allow formation of the bond, said bonding being effected by means of a tool whose working face has a central protuberance of a face area substantially equal to the area over which bonding pressure is to be applied and not greater in its width than the width dimension of the metallic conductor, the central protuberance being surrounded by a shoulder dimensioned to effect the required constraint on the plastic flow of metal, the height of said shoulder above the end of said protuberance approximately corresponding with the depth to which said protuberance is to penetrate into the metallic conductor in effecting the said deformation.

2. A method as claimed in claim 1, wherein the conductor is a metallic wire and wherein the central protuberance of the working face has a face area substantially equal in width to the diameter of the wire and a height about one third of that diameter, the protuberance being surrounded by a shoulder of overall face area having a width about three times the wire diameter, and wherein the bonding is effected by placing a length of the wire on the surface, superposing the width of the protuberance on the wire at a point along that length, and applying a force to the tool so as to produce, in the wire, over the face area of the protuberance a deformation of at least 20% but not more than 60% and to create round that area a formation in the wire whose depth measured in a plane normal to the surface of the other material is not substantially less than the diameter of the wire.

3. A method as claimed in claim 1 in which the central protuberance is a cylindrical form and in which the shoulder is circular when seen in plan.

4. A method as claimed in claim 1 in which both the central protuberance and the shoulder are of frusto-conical form.

5. A method as claimed in claim 1 in which the central protuberance is of frusto-conical form and is surrounded by a concave shoulder of circular form when seen in plan.

6. A method as claimed in claim 1 in which the central protuberance is tapered in a direction away from the shoulder which is itself flat.

7. A method as claimed in claim 1 in which the conductor consists essentially of metal selected from the group consisting of aluminium, gold, platinum, and in which the substrate surface is the surface of a body of material selected from the group consisting of aluminium, silicon, germanium, Kovar.

References Cited

UNITED STATES PATENTS

| | | | |
|---|---|---|---|
| 2,703,998 | 3/1955 | Sowter | 29—470.1 |
| 3,006,067 | 10/1961 | Anderson | 29—497.5 X |
| 3,075,282 | 1/1963 | McConville | 29—498 X |
| 3,087,239 | 4/1963 | Clagett | 29—498 X |
| 3,091,849 | 6/1963 | Cohen | 29—498 X |
| 3,125,803 | 3/1964 | Rich | 29—498 X |
| 3,209,450 | 10/1965 | Klein | 29—498 X |
| 3,223,820 | 12/1965 | Matsuura. | |
| 3,274,667 | 9/1966 | Siebertz | 29—155.5 |

FOREIGN PATENTS

| | | |
|---|---|---|
| 881,832 | 11/1961 | Great Britain. |
| 881,834 | 11/1961 | Great Britain. |

OTHER REFERENCES

Electrical Contact With Thermo-Compression Bonds, by H. Christensen, April 1958, pp. 127–130, Bells Laboratories Record.

CHARLIE T. MOON, *Primary Examiner.*

R. F. DROPKIN, *Assistant Examiner.*